United States Patent [19]

Frost et al.

[11] 4,415,344

[45] Nov. 15, 1983

[54] DIESEL PARTICULATE FILTERS FOR USE WITH SMALLER DIESEL ENGINES

[75] Inventors: Rodney I. Frost, Corning; Max R. Montierth, Elmira, both of N.Y.

[73] Assignee: Corning Glass Works, Corning, N.Y.

[21] Appl. No.: 353,803

[22] Filed: Mar. 1, 1982

[51] Int. Cl.$^3$ .............................................. B01D 39/20
[52] U.S. Cl. .............................. 55/523; 55/DIG. 30; 60/311
[58] Field of Search .......... 55/484, 504, 523, DIG. 5, 55/DIG. 30; 422/171, 179, 180; 428/116–118; 252/477 R; 60/295, 299, 311; 29/163.5 F; 501/112, 119, 80; 210/510; 165/8

[56] References Cited

U.S. PATENT DOCUMENTS

| | | | |
|---|---|---|---|
| 3,885,977 | 5/1975 | Lachman et al. | 501/119 |
| 3,950,175 | 4/1976 | Lachman et al. | 501/80 |
| 4,001,028 | 1/1977 | Frost et al. | 501/80 |
| 4,276,071 | 6/1981 | Outland | 55/523 |
| 4,297,140 | 10/1981 | Paisley | 428/116 |
| 4,329,162 | 5/1982 | Pitcher, Jr. | 55/523 |
| 4,364,760 | 12/1982 | Higochi et al. | 55/523 |
| 4,364,761 | 12/1982 | Berg et al. | 55/523 |

Primary Examiner—David L. Lacey
Attorney, Agent, or Firm—R. N. Wardell

[57] ABSTRACT

A diesel particulate filter for removing particulates from the exhaust gases of smaller displacement light duty vehicle diesel engines (about 3.0 liters or less cylinder displacement or more refined larger engines) which typically generate particulates at an average rate of about 0.45 gm./mile or less in a normal driving cycle comprising a honeycomb structure formed by a matrix of thin interconnected porous walls defining a multiplicity of cells extending, in preferred embodiments, in a substantially longitudinal and mutually parallel fashion through the filter. An inlet group of the cells is open at and define an inlet open end face of the filter. An outlet group of the cells is open at and define an outlet end face of the filter. The inlet cells are closed adjacent to the outlet end face and the outlet cells are closed adjacent to inlet end face. The volume of the thin wall internal open porosity and the mean diameter of the pores forming the thin wall internal open porosity lie within the area defined by the boundary lines connecting the points A-B-C-D in FIG. 5.

17 Claims, 5 Drawing Figures

DIESEL PARTICULATE FILTERS FOR USE WITH SMALLER DIESEL ENGINES

BACKGROUND OF THE INVENTION

This invention relates to diesel engine exhaust particulate filters of honeycomb structure, hereinafter referred to as "DPF's", and, in particular, to improved DPF's for smaller displacement diesel engines.

It is well known that solid particulates and larger particles may be filtered from fluids by passing the particulate contaminated fluids through porous walled honeycomb structures. U.S. Pat. No. 4,276,071 and a pair of pending applications Ser. Nos. 165,646 and 165,391, both filed July 3, 1980 and assigned to the assignee hereof, the latter now U.S. Pat. No. 4,329,162 describe and claim honeycomb filters for removing carbonaceous solid particulates from diesel engine exhausts and other filtering applications. Each DPF has a multiplicity of interconnected thin porous walls which define at least one inlet surface and one outlet surface on the filter and a multiplicity of hollow passages or cells extending through the filter from an inlet surface or an outlet surface or both. Inlet cells are formed open at at least one inlet surface to admit contaminated fluid into the filter. The inlet cells are closed where they adjoin any outlet surface of the filter. Outlet cells are formed open at an outlet surface to discharge fluid which has passed through the filter. The outlet cells are similarly closed where they adjoin any inlet surface. The interconnected thin walls are provided with an internal interconnected open porosity which allows the fluid to pass from the inlet to the outlet cells while restraining a desired portion of the solid particulates in the fluid from passing therethrough. The particulates are trapped in or collected on the surfaces of the thin walls defining the inlet cells. As the mass of collected particulates increases, back pressure across the filter increases and/or the flow rate of fluid through the filter decreases until an undesirable level of back pressure and/or flow rate is reached and the filter either is regenerated by removal of the trapped particulates or discarded. DPF's are typically installed in a housing which is inserted like a muffler or catalytic converter into the exhaust system of a diesel engine equipped vehicle.

Existing U.S. Government regulations (Title 40 Consolidated Federal Regulations §§86.082-8,86.082-9, July 1, 1981 Rev.) of the Environmental Protection Agency ("EPA") limit solid particulate emissions from light duty diesel engine equipped vehicles to 0.6 grams per mile ("gm./mi.") in 1982. A 0.2 gm./mile limit has been mandated for 1985 vehicles. Maximum emissions of larger displacement (i.e., 8 cylinder and larger 6 cylinder) diesel engines have been on the order of about 0.4 to 0.7 gm./mile in a normal driving cycle. For example, in the aforesaid application Ser. No. 165,646, the 1980 Oldsmobile 350 CID (5.9 liter) V-8 engine used for comparatively testing filter compositions and configurations generated particulates at an average rate, per 4 cylinder bank of the engine, of between about 0.17 and 0.24 gm./mi. under steady state moderate speed operation (approximately 30 mph constant). The same engine would produce particulates at average rates of about 0.5 and 0.6 gm./mi. during a normal driving cycle. The term "normal driving cycle" is used in the same manner as it is used in E.P.A. regulation to refer to the test(s) under which a light duty vehicle diesel engine is certified for use in the United States. See Title 40, Consolidated Federal Regulations ¶ ¶ 86.101 et. seq. (July 1, 1981, Rev.). Lower emission rates, about 0.35 gm./mi. or less, are typically generated by much smaller (i.e. about 3.0 liter or less total cylinder displacement) six and four cylinder diesel engines which are being offered in 1981 or have been proposed for future models. These include a variety of diesel engines being manufactured by various Japanese concerns ranging from a 2.8 liter, 6 cylinder engine by Nissan down to a 2.0 liter, 4 cylinder engine manufactured by Toyo Kogyo as well as the 1.6 liter Volkswagon diesel engine. Recent certification testing of diesel engines for use in 1982 light duty vehicle engines, including larger V-6 and V-8 engines to be offered, will generate particulates at average rates of about 0.45 gm./mi. or less over normal driving cycles and a significant majority of those engines will generate particulates at average rates of about 0.35 gm./mi. or less or the normal driving cycle. Thus, DPF's or other apparatus will not be required in most diesel engine equipped vehicles for 1982 but apparently will be required in virtually all vehicles equipped with existing types of diesel engines by 1985 to meet the federal diesel particulate emission restrictions.

Certain considerations are helpful in evaluating and comparing DPF's. One is filter efficiency, that is, the amount of suspended particulates which are removed from the fluid as it is passed through the filter (hereinafter expressed as a percentage of the weight of all particulates in the fluid prior to its passage through the filter). Desirably, no more efficiency is provided than is absolutely necessary as increased efficiencies typically increase filter back pressure and reduce useful operating time. Another consideration is pressure drop across the filter, that is the difference between the fluid upstream and downstream from the filter caused by the presence of the filter and particulates therein. As pressure drop increases so does the engine exhaust back pressure. Useful operating time is the cumulative time of service of a DPF until its pressure drop and engine exhaust back pressure become sufficiently great as to necessitate the regeneration or replacement of the filter. Another significant consideration is compact structure, the smallest space-saving volume and configuration of the filter for obtaining the best combination of filter efficiency, back pressure characteristics and useful operating time. Other desirable features include thermal shock resistance, mechanical strength and non-deleterious reaction with the exhaust gases.

The U.S. Pat. No. 4,276,071 describes the characteristics of a DPF having a single inlet end face and a single outlet end face on opposing surfaces of the filter and a multiplicity of cells extending through the filter in a mutually parallel fashion between the inlet and outlet end faces. This type of filter is hereinafter referred to as a "unidirectional flow-type" DPF. The thin walls forming the cells of the filter are described as having an open porosity with a 10% internal open volume formed by pore spaces having mean sizes ranging between about 2 to 15 microns. The patent further describes using a pair of such filters with an 8 cylinder, V-type automotive diesel engine, each filter being connected with one of the engine's two banks of four cylinders.

The applications Ser. Nos. 165,646 and 165,391 describe several ceramic batch mixtures for fabricating DPF's with porous thin walls having internal open volumes ranging between about 35% and 66% formed by pores having mean diameters ranging between about 4 and 35 microns. The application Ser. No. 165,391 particularly claims a field of DPF thin wall open porosities having open pore volumes and mean pore sizes ranging between about 35 to 90% and about 1 to 20 microns, respectively. It is believed that filters formed with thin walls having open porosities lying within the field to have acceptable pressure drop characteristics and filtration efficiencies of about 75% or more in desired filter configurations, levels which would be needed to assure meeting the 1985 federal particulate emission standards with the largest displacement diesel engines being offered in the 1980-1981 period, and to provide extended useful operating life when compared with the performance of a comparably dimensioned DPF having the thin wall open porosity disclosed in the U.S. Pat. No. 4,276,071.

It would be desirable to identify a field of thin wall open porosities to meet the proposed 1985 light duty vehicle diesel engine particulate emission requirements (i.e. 0.2 gm./mi.) as was done in the aforesaid Ser. No. 165,391 application and optimized for use with the existing design (i.e. 1981) smaller displacement diesel engines as well as with the majority of improved diesel engines (i.e. 1982) of all displacements so as to provide greater filter operating life or more compact filter size or both.

SUMMARY OF THE INVENTION

The invention comprises an exhaust system incorporating a diesel particulate filter of honeycomb structure for use with a light duty vehicle diesel engine emitting particulates at average rates of about 0.45 gm./mi. or less in a normal driving cycle as that term is defined under existing Federal Regulations (Title 40, Consolidated Federal Regulation, July 1981, Rev.). The filters are each formed by a multiplicity of thin, interconnected walls having an internal interconnected open porosity of a volume and formed from pores of mean diameters sufficient to allow the exhaust gas to pass through the thin walls and to restrain at least a significant portion of the particulates. The thin walls define at least one open inlet end face and at least one open outlet end face on outer surfaces of the filter and a multiplicity of hollow cells each extending through the filter from at least one of the open end faces. Cells of an inlet group are each closed where they adjoin any outlet end face and are open at at least one inlet end face to admit particulate contaminated exhaust gas into the filter. Cells of an outlet group are each closed where they adjoin any inlet end face and are open at at least one outlet end face as to provide an exit for the exhaust gases passing through the filter. The filter is installed across the exhaust conduit system carrying the exhaust gases away from the engine with each inlet end face in communication with the upstream particulate contaminated exhaust gas generated by the engine and with each outlet end face in communication with the remainder of the exhaust system downstream of the filter leading to the atmosphere. According to the invention, the volume of the open porosity within the thin walls and the mean diameter of the pore spaces forming the open porosity lie within the area defined by the boundary lines connecting the points A-B-C-D in FIG. 5. Open porosity is determined by conventional mercury-intrusion porosimetry.

According to one important feature of the invention, the thin walls are formed no more than about 0.76 mm. thick and, preferably about 0.30 mm. thick for improving thermal shock performance while optimizing compact filter size, pressure drop and efficiency. Preferably all thin walls are of the same substantially uniform thickness.

Preferably too, the filter is a unidirectional flow-type having one inlet end face and one outlet end face on opposing outer surfaces of the filter, in which the inlet and outlet cells extend in a substantially longitudinally and mutually parallel fashion through the filter between the two end faces.

According to yet another important aspect of the invention, the transverse cross-sectional density of the cells is at least about 4 cells/cm.$^2$ and, preferably, between about 15.5 and 31 cells/cm.$^2$ for maximizing filter surface area within a compact structure.

According to yet another important aspect of the invention, batch mixtures are described for fabricating the invention, cordierite honeycomb thin wall matrices and plugs.

BRIEF DESCRIPTION OF THE DRAWINGS

The invention will be hereinafter described in detail with reference to the accompanying drawings in which.

DETAILED DESCRIPTION OF THE INVENTION

Figure 1:
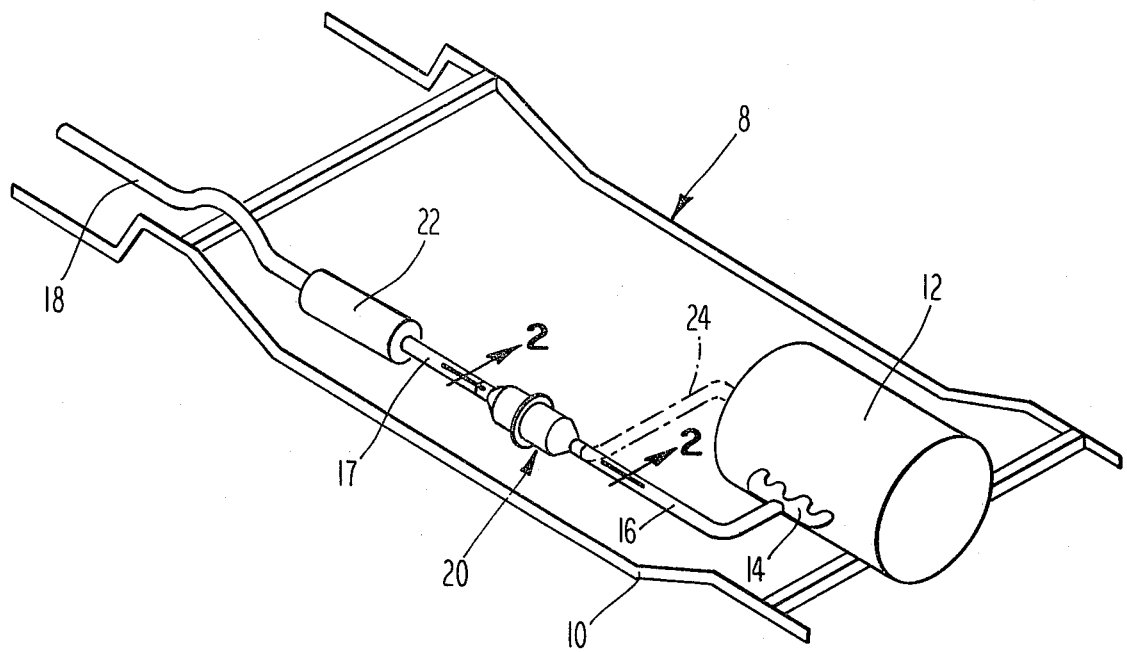
FIG. 1 depicts diagrammatically a light duty vehicle equipped with a small displacement diesel engine and filter of the present invention.

FIG. 1 depicts diagrammatically the chassis 10 of a light duty vehicle 8 mounting a small displacement diesel engine 12. The engine 12 typically has four cylinders as depicted, although as many as eight cylinders or fewer than four cylinders may be provided. The engine 12 produces particulates at an average rate no greater than about 0.45 gm./mile in a normal driving cycle as that term is used in EPA regulations, Title 40, Consolidated Federal Regulations July 1981, Rev., incorporated by reference herein, particularly as used in Sections 86.082-8, 86.082-9 and 86.101 et. seq.. Thus, the engine may be one of current (i.e. 1981) design having a smaller cylindrical displacement (i.e. less than about 3.0 liters) or newer (i.e. 1982 or newer) improved engines of equivalent or larger displacements. An exhaust manifold 14 is mounted to the engine 12 to collect the exhaust gases generated by the engine cylinders and is in turn connected to the remainder of the vehicle's exhaust system comprising pipes 16, 17 and 18, a diesel particulate filter housing or can 20 and a muffler 22. It is envisioned that where two banks of cylinders are provided in the engine 12, as in a V-type engine, a second manifold (not depicted) and exhaust pipe 24 (indicated in phantom) will be provided to carry exhaust gases generated by the second row of cylinders to the DPF can 20.

The exhaust pipes 24 and 16 form a "Y" junction where they meet. Alternatively, but less desirably, a can 20 with filter may be installed in each pipe 16 and 24 to filter the exhaust from a pair of engine cylinder banks. The can 20 is formed and installed in a conventional fashion as is depicted and described in the aforesaid application Ser. No. 165,646 and patents referenced therein, which are fully incorporated by reference herein.

Figure 2:
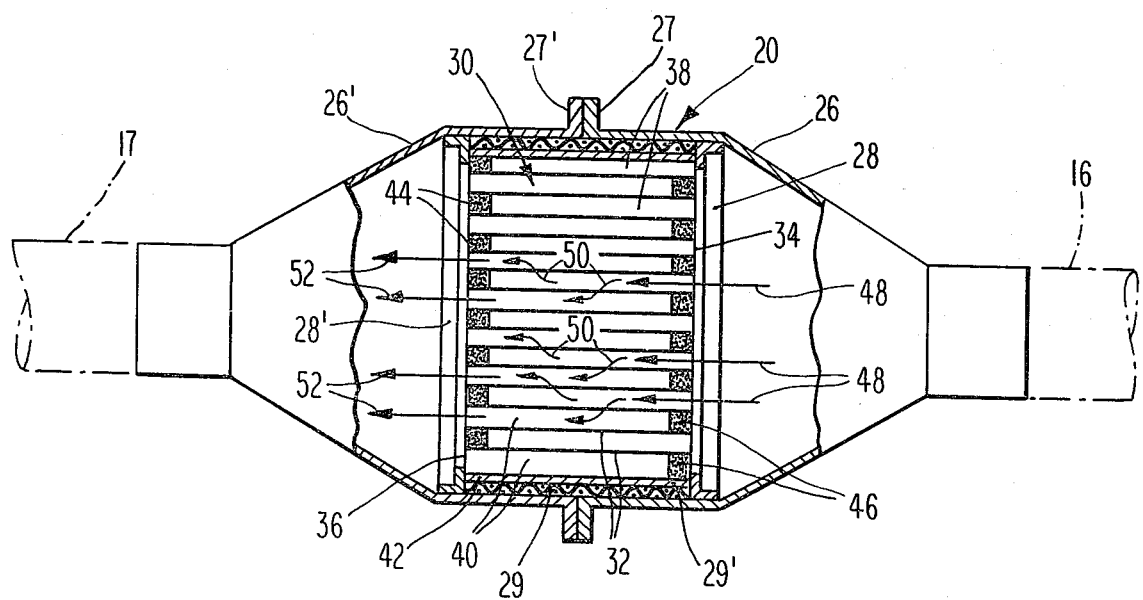
FIG. 2 is a longitudinally sectioned view along the lines 2—2 of the filter housing installed within the exhaust system of the vehicle of FIG. 1 and further depicts in a longitudinally sectioned view, a unidirectional flow-type honeycomb diesel particulate filter of the present invention installed therein.
Figure 3:
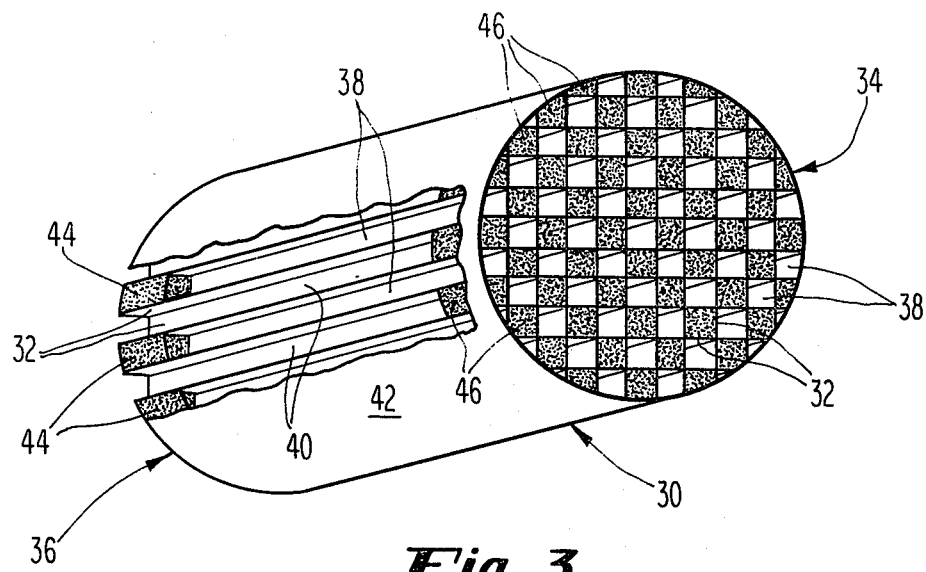
FIG. 3 is a perspective view of the filter depicted in section in FIG. 2.

FIG. 2 reveals the construction of the can 20 and the mounting of a unidirectional flow-type diesel particulate filter 30 contained herein. The can 20 is similar to a conventional type of can employed for mounting catalytic converter honeycomb substrates in exhaust systems as is described, for example, in U.S. Pat. No. 3,441,381, incorporated by reference herein. The can 20 comprises two substantially identical filter-holding shells 26 and 26' having mating flanges 27 and 27', respectively, which are mechanically fastened together (e.g. by nuts and bolts not shown) to keep the can 20 assembled during use and to allow disassembly for regeneration or replacement of the filter 30. The one shell 26 is connected to the upstream exhaust pipe 16 (in phantom) and the remaining shell 26' is connected to the downstream exhaust pipe 17 (in phantom), both by conventional means such as welding, brazing or clamps (not depicted). Internal annular mounting members 28 and 28' of L-shaped cross-sections are respectively fastened to the shells 26 and 26' so as to abut against faces 34 and 36 of the filter 30 (preferably with customary sealing material therebetween) holding it in proper fixed axial position within the can 20. To cushion the filter 30 against mechanical shock and vibration, it is ordinarily desirable to surround it with a wrapping or mat 29 of metal mesh, refractory fiber or the like, which fills the annular space between the filter 30 and shells 26 and 26'. To minimize heat loss from the filter 30, the wrapping or mat 29 may include a layer of insulating material such as glass or mineral wool mat 29'. The filter 30 is also depicted in a perspective view in FIG. 3 with its outer wall 42 partially broken away. The filter 30 comprises a multiplicity of interconnected thin walls 32 forming a matrix defining an inlet end face 34 in communication with the exhaust gases coming from the engine 12 upstream from the filter 30, represented in FIG. 2 by lined arrows 48, and an outlet end face 36 on the opposite outer surface of the filter 30 in communication with the exhaust gases downstream of the filter 30 flowing to disposal into the atmosphere, represented again in FIG. 2 by lined arrows 52, and a multiplicity of hollow passages or cells 38 and 40 extending in a substantially longitudinal and mutually parallel fashion through the filter 30 between the end faces 34 and 36. The filter 30 is also provided with a smooth outer wall or skin 42 interconnected with and extending continuously around the matrix of thin walls 32 and between the end faces 34 and 36. A group of inlet cells 38 are open at the inlet end face 34 and closed where they appear at the outlet end face 36. A group of outlet cells 40 are open at the outlet end face 36 and closed near the inlet end face 34. The cells 38 and 40 are closed with plugs 44 and 46 near the end faces 36 and 34, respectively, but may be sealed, covered over, or otherwise closed at or near the end faces 34 and 36 by other means. Each of the cells is closed at one and desirably only one of the two end faces 36 and 34 to form an inlet or outlet cell 38 or 40, respectively. Cells may be closed at both end faces 34 and 36, although this will reduce the filtration capacity and thus the useful filter operating life. It is undesirable to leave any of the cells open along their entire length as this would allow the exhaust gas contaminants to pass unrestrictedly through the filter 30. The plugs 46 at the inlet end face 34 of the outlet cells 40 have been shaded for clarity. As can be best seen in FIG. 3, the cells 38 and 40 are plugged in a checkerboard fashion with each inlet cell 38 adjoining and sharing thin walls 32 in common with only outlet cells 40 and vice versa. It will also be appreciated that the pattern of plugs 46 of the outlet cells 40 visible on the inlet end face 34 of the filter 30 in FIG. 3 is thus reversed at the outlet end face 36 (not depicted) with the plugs 44 of the inlet cells 38.

Operation of the filter 30 is partially depicted in FIG. 2. Contaminated fluid 48 is brought from the manifold 14 through the pipe 16 (and pipe 24, if provided) to the can 20 and inlet end face 34 of the filter 30 where it enters the inlet cells 38. Because the inlet cells 38 are closed near the outlet end face 36, the contaminated fluid within the cells 38 passes predominantly through the interconnected open porosity of the thin walls 32, in the manner indicated by the lined arrows 50, into the outlet cells 40 adjoining each inlet cell 38. The now filtered fluid 52 passes from the filter body 30 through the outlet cells 40 and from the can 20 into the pipe 17 for disposal to the atmosphere through the remainder of the exhaust system. The thin walls 32 also contain sufficient interconnected open porosity for the fluid to flow through the longer dimensions of the thin wall (not depicted).

Figure 4:
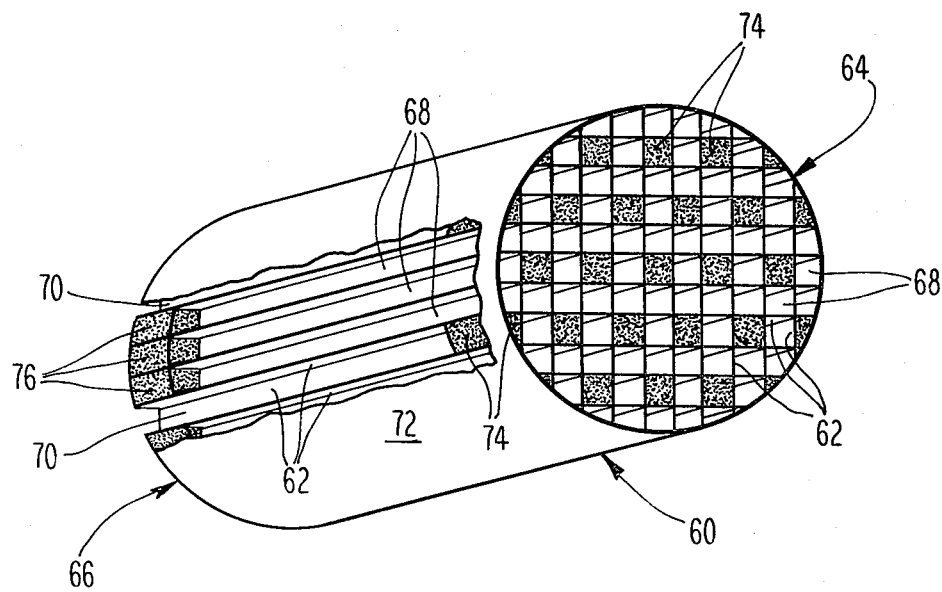
FIG. 4 is a perspective view of a second embodiment filter of the present invention.

FIG. 4 is a perspective view of a second embodiment unidirectional flow-type diesel particulate filter 60 again formed by a multiplicity of interconnected thin porous walls 62 which define an inlet end face 64 and an outlet end face 66 on opposing outer surfaces of the filter 60 and a multiplicity of hollow cells 68 and 70 extending in a substantially longitudinal and mutually parallel fashion through the filter 60 between the end faces 64 and 66. Again, a continuous outer wall or skin 72 has been provided extending around the thin walls 62 and between the end faces 64 and 66. Plugs 74 close the ends of outlet cells 70 of the filter 60 near its inlet end face 64 while plug 76 close the ends of inlet cells 68 near the outlet end face 66. The plugging pattern at the outlet end face 66 is again reversed from that at the inlet end face 64 in FIG. 4. Whereas in the first filter embodiment 30 substantially equal numbers of inlet and outlet cells 38 and 40 are provided, the filter 60 of FIG. 5 contains 3 times as many inlet cells 68 as outlet cells 70 so as to asymmetrically allocate the exposed surface areas of the thin wall in favor of the inlet cells as is described and claimed in two pending applications Ser. Nos. 350,995 and 350,994 filed on the same date as this application, assigned to the assignee hereof and incorporated by reference herein. Asymmetrically allocating the thin wall surface areas in favor of inlet cells provides a higher initial filter pressure drop but a reduced back pressure increase rate due to particulate build up generally yielding greater particulate capacity and useful operating life for filters of otherwise essentially similar makeup. Operation of the filter 60, as well as fluid flow through the longer dimensions of the thin walls of both filters 30 and 60 are described in the two referenced applications Ser. Nos. 350,995 and 350,994.

The matrices of thin walls 32 and 62 may be formed from any suitable material providing the desired interconnected open porosity. These materials include powdered metals, glasses, ceramics (generally crystalline), resins or organic polymers, papers or textile fabrics (with or without fillers), etc. in combinations thereof including, for example, glass-ceramic mixtures and cermets. It is preferred to fabricate the thin walls 32 and 62 from plastically formable and sinterable finely divided particulates and/or short length fibers of substances that yield a porous sintered material after being fired to effect the sintering thereof, especially powdered metals, glasses, and ceramic based materials including, in addition to conventional ceramics, glass-ceramics, cermets and other ceramic based mixtures. In addition to volatizable plasticizers and/or binders, which may be used to prepare a workable batch mixture, any suitable fugitive or combustible (burn-out) additive can be dispersed within the formable and sinterable mixture so as to provide substantially uniformly distributed and randomly interconnected open porosity in the sintered thin walls 32 and 62 after firing. The requisite open porosity can be designed into the thin walls 32 and 62 by raw material selection as described in U.S. Pat. No. 3,950,175, incorporated by reference.

3,790,654, 3,919,384 and 4,008,033 and in commonly assigned application Ser. No. 260,343 filed May 4, 1981, now U.S. Pat. No. 4,364,888 and incorporated by reference herein.

After extrusion, the TABLE I batch mixture substrates are dried and fired generally in accordance with the following firing schedule:

HEAT
    50° to 200° C. in 3 hrs.,
    200° to 350° C. in 7 hrs.,
    350° to 500° C. in 3 hrs.,
    500° to 600° C. in 10 hrs.,
    600° to 1400° C. in 29 hrs.,
SOAK
    1400° C. for 8 hrs.
COOL
    at furnace rate (about 12 hrs. to 200° C.)

Heating rates should be substantially linear. The walls of the fired substrates formed from the TABLE I batch mixtures typically have substantially uniformly distributed and randomly interconnected open porosity of volumes and mean pore diameters set forth in that table.

TABLE I

Batch Compositions - 100 weight % of total ceramic and graphite raw materials

| | MIXTURES | | | |
|---|---|---|---|---|
| | 1 | 2 | 3 | 4 |
| RAW MATERIALS | | | | |
| Georgia-Kaolin Hydrite MP Clay (APS[a] 9.7) | 19.35 | 19.35 | 20.12 | 20.96 |
| Georgia-Kaolin Glomax LL Clay (APS 1.9) | 16.28 | 16.28 | 16.94 | 17.64 |
| Pfizer MP 95-28 Talc (APS 20) | — | 30.93[c] | 32.17[c] | 33.51[c] |
| Pfizer BX 148 Talc (APS 73) | 30.93 | — | — | — |
| Alcoa A-2 Alumina (APS 5.8) | 10.36 | 10.36 | 10.77 | 11.22 |
| Asbury 4012 graphite[b] | 23.08 | 23.08 | 20.00 | 16.67 |
| Methyl cellulose binder/plasticizer | 4.0 | 4.0 | 4.0 | 4.0 |
| Alkali sterate extrusion aid | 0.5 | 0.5 | 0.5 | 0.5 |
| Distilled water | 26.0 | 26.0 | 26.5 | 26.0 |
| POROSITY | | | | |
| Average open porosity[d] (% bulk wall volume) | 45 | 43 | 45 | 45 |
| Mean pore diameter[d] (micrometers) | 32.5 | 44 | 38 | 36 |

[a]APS means average particle size in micrometers
[b]Particle size (wt. %): 1.4 +120 mesh, 21.1% −120 +140 mesh, 63.9% −140 +200 mesh, 13.6 −200 mesh (U.S. Std. Sieve) (Note: + fraction is not passed through indicated screen; − fraction is passed.)
[c]Only +150 mesh (U.S. Std. Sieve) screened fraction used yielding an APS of about 90.
[d]Individual batch mixtures may produce open porosities varying within a range of ±8% from the indicated values.

Four exemplary batch mixture formulations for fabricating cordierite ceramic materials of the type disclosed in U.S. Pat. Nos. 3,885,977 and 4,001,028, both incorporated by reference herein, which have been found to have the stability and durability to withstand the thermal, chemical and physical environment of automotive exhaust systems and which provide the aforesaid requisite thin wall open porosity are set forth in TABLE I. The mixtures are listed in descending order of preference. Approximate relative efficiencies of the four mixtures are listed in TABLE II for various wall thicknesses. Mixture 1 is most preferred for manufacture as it uses a soon to be commercially available grade of talc whereas the +150 screened talc involves considerable wastage. Initial tests have indicated that Mixture 1 filters also have an initial low pressure drop comparable to that provided by Mixture 2, at least in the 0.012 inch thick wall configuration.

Although they may be fabricated by any suitable technique for the thin wall materials selected, matrices of interconnected thin walls 32, 62, including those of the four batch mixture compositions of TABLE I, are preferably formed monolithically with a skin 42, 72 by extrusion in the manner disclosed in U.S. Pat. Nos.

The mixtures 1 through 4 of TABLE 1 are based upon adding various amounts (20 to 30% by weight) of specifically sized graphite particles to a base mixture (100% by weight) of raw ceramic materials consisting essentially of: 46.3% kaolin clay (preferably 25.14% GeorgiaKaolin Hydrite MP and 21.16% Georgia-Kaolin Glomax LL); 40.2% talc; and 13.5% alumina (preferably Alcoa A-2). Mixture 4 of TABLE I, above, was previously identified as Sample mixture I-J-K of TABLE I of the aforesaid applications Ser. Nos. 165,646 and 165,391 but was investigated and found unsuitable for that field of use and was not claimed. The mixtures 1, 2 and 3 of TABLE I of the present application differ from each of the compositions listed in the aforesaid applications Ser. Nos. 165,646 and 165,391 in that each includes at least 25% by weight graphite particles in combination with talc having an average particle size greater than about 20 microns. The larger average particle size of the talc in the Mixtures of TABLE I, herein, particularly in combination with the higher graphite percentages (25% or more added to 100% ceramic raw material) of the Mixtures 1 through 3 of that table provide the lower effficiencies desired for the present invention as compared to the higher efficiencies provided by the compositions (Samples D through H and Sample N) claimed in the aforesaid Ser. No. 165,391 patent application. The variation among the open porosity characteristics of the batch mixtures is significantly related to the proportions and compositions of the graphite added to and the talc of the base mixture.

TABLE II

Approximate Relative Efficiencies (% wt of particulates trapped)

| Thin Wall Thickness | 0.025 in. (0.63 mm) | 0.017 in. (0.46 mm) | 0.012 in. (0.30 mm) |
|---|---|---|---|
| MIXTURES | | | |
| 1 | — | 85 (est.) | 60 (est.) |
| 2 | 60 (est.) | 50 (est.) | 40 (est.) |
| 3 | 65 (est.) | 60 (est.) | 45 (est.) |
| 4 | 70 | 63 | 45 |

*Variations between individual batches of the same mixtures may range ±7.5% from indicated values. Greater variations typically indicate a failure to follow proper fabricating procedures or use of non-conforming raw materials.

Thin walls 32, 62 can be formed from the batch mixtures of TABLE I in thicknesses of about 0.002 inches (about 0.05 mm) or more although thicknesses of about 0.030 inches (about 0.76 mm.) or less are desired and of about 0.012 inches (about 0.30 mm.) are preferred for maximizing structural integrity while minimizing susceptibility of the resultant filter to thermal shock which is dependant, in part, upon thin wall thickness. Cellular transverse cross-sectional densities of between about 25 and 400 cells/in.$^2$ (about 3.9 and 62 cell/cm.$^2$, respectively) are typically useful. For the preferred Mixture 1 material, a cell density of about 200 cells/in.$^2$ (about 31 cells/cm.$^2$) is preferred for performance (i.e. to minimize filter size without unduly restricting cell channel size to provide about 60% efficiency and low pressure drop) but densities closer to 100 cells/in.$^2$ (about 15.5 cells/cm.$^2$) are preferred for ease of manufacture with present technologies.

Figure 5:
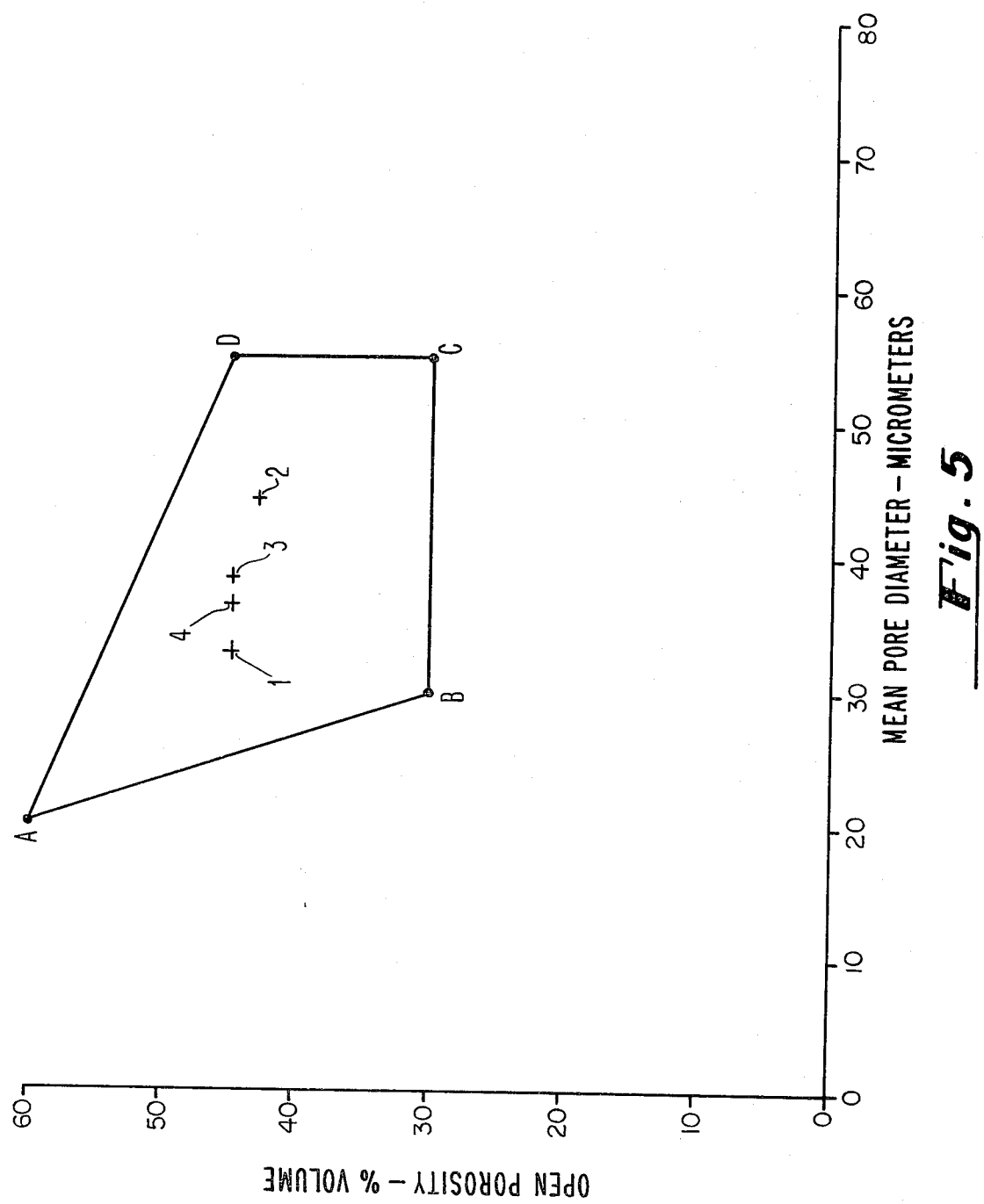
FIG. 5 is a graphical representation of the open porosity (open volume and mean pore size) of the thin walls of filters according to the present invention. The combination of open pore volume and mean pore size of the present invention lie within the area defined by the lines connecting the points A-B-C-D.

FIG. 5 is a graphical representation of DPF thin wall open porosity represented by a pair of open pore volume (ordinate) and mean pore diameter (abscissa) values. The open porosities of the batch mixtures 1 through 4 of TABLE II are indicated by the points 1 through 4, respectively. According to the invention, open porosities (pairs of open pore volume and mean pore diameter values) lying within the area encompassed by the lines connecting the points A-B-C-D provide DPF thin walls having the desired efficiencies (less than about 70%) at about optimum thin wall thickness (about 0.012 in.). Useful operating life of a resultant DPF will depend on a variety of factors in addition to thin wall porosity and thicknesses including the operating characteristics of the particulate diesel engine employed (particulate generation rate and maximum sustainable exhaust back pressure) and the physical characteristics of the DPF including its volume, aspect ratio (end face diameter to length ratio), and inlet and outlet cell sizes, shapes and arrangements. Area A-B-C-D has the following coordinate values:

| | COORDINATES | |
|---|---|---|
| Point | Open Porosity % | Mean Pore Diameter (micron) |
| A | 60 | 20 |
| B | 30 | 30 |
| C | 30 | 55 |
| D | 45 | 55 |

The line connecting the points A and D represents the suggested upper limits of open porosity to provide adequate filter strength at the desired thin wall thicknesses; the line connecting the points B and C represents the minimum suggested open pore volume (30%) to provide acceptable pressure drop in the resulting filter; the line connecting the points C and D represents the practical upper limit of mean pore size (55 microns) based on present manufacturing technologies, particularly talc manufacture; and the line connecting the points A and B represents the combination of open pore volume and mean pore diameter providing efficiencies of about 70% or less in the desired thin wall thicknesses.

The ends of the cells 38, 40, 68 an 70 may be closed with any material and/or in any manner compatible with the material of the thin walls 32 and 62 under the envisioned service conditions of the filter 30 and 60. This includes non-deleterious reaction with the thin wall material and/or diesel exhaust gas, good adhesion to the thin wall material, suitable durability to gas flow at the experienced flow rates, similar coefficients of thermal expansion. Typically, plugs 44, 46, 74 and 76 are formed by charging a flowable or formable plugging material into selected cell ends and then curing, drying or firing the structure to transform the formable/flowable material into a solid closure which adheres mechanically and/or chemically to the thin walls 32 or 62 and completely covers or fills the cell ends. Methods and apparatus for plugging honeycomb structures with flowable and/or formable materials are described and claimed in related applications Ser. Nos. 283,732 through 283,735, filed July 15, 1981, and Ser. Nos. 295,610 and 295,611 filed Aug. 24, 1981, all assigned to the assignee of this application and incorporated by reference herein. The plugs 44, 46, 74, and 76 or other closure means may be either porous or non-porous although in the former case, the open porosity (i.e., pore volume and mean pore size) should be sufficient to prevent the passage of at least undesirable amounts of solid particulates through or around the plugs and hence through the filter 30 or 60.

Plugs for the cordierite substrates formed from the TABLE I batch mixtures are preferably formed in appropriate cell ends with a foaming ceramic cement which is described generally in commonly assigned patent application Ser. No. 165,647, filed July 3, 1980, now U.S. Pat. No. 4,297,140, and incorporated by reference herein. The cement expands and reacts to a primarily cordierite crystal phase when fired. A particular composition of that cement described in the aforesaid application Ser. No. 165,646 is preferred for use in DPF's and other automotive exhaust applications. Preferably, a punched tape or elastic mask described in the application Ser. Nos. 283,732 or 283,734, respectively, are used in charging the foaming cement into the cell ends.

While it is preferred to make the transverse cross-sectional geometry of the cells 38, 40, 68 and 70 to be squares of substantially uniform size as is depicted in the two described embodiments, other geometries including those which are disclosed in the U.S. Pat. No. 4,276,071 and the aforesaid application Ser. No. 165,646 and/or different cell sizes may also be used. If other geometries and/or sizes are used, the thin walls 32 and 62 should be designed to intersect so as to form included angles that are preferably not less than about 60° to avoid nonuniform accumulation of particles of smaller angle corners and to assist in the proper plugging of the cell ends adjoining the end faces 34, 36, 64 and 66 as is described and claimed in the aforesaid application Ser. No. 165,646. Also, it is desirable for enhanced mechanical strength of the filter that the thin wall intersections, (i.e., the cell corners) be fileted (not depicted). Also, if it is desired for other purposes, filters can be formed having a plurality of transverse sectors (e.g., annular or wedge shape) distinguished by the size or shape of their cells, or both. It is further envisioned that patterns of different cellular transverse geometric shapes can be repeated across the end faces of the filter or across the transverse sectors thereof.

While the invention has been described in terms of unidirectional flow-type filters, which are preferred, it is further envisioned that a cross-flow type of filter such as is described in the aforesaid U.S. Pat. No. 4,276,071 may be fabricated with thin walls having an open porosity lying within the area A-B-C-D of FIG. 5 for use with light duty vehicle diesel engines operating at particulate emission rates of about 0.45 gm./mi. or less. Such filters typically have one or two inlet end faces and one or two outlet end faces and a group of substantially mutually parallel inlet cells extending through the filter from (or between) the inlet end face(s) and a group of substantially mutually parallel outlet cells extending through the filter from (or between) the outlet end face(s). The inlet cells are each open at at least one inlet end face and are closed proximal to each outlet end face. The outlet cells are correspondingly each open at at least one outlet end face and are closed proximal to each inlet end face.

While various embodiments of the invention and suggested modifications thereto have been described, it should be understood that other modifications could be made on the structure, composition and/or arrangement of the described embodiment components without departing from the scope of the invention which is more fully defined in the following claims.

We claim:

1. In an exhaust system for use with a light duty vehicle diesel engine emitting particulates at a rate of less than about 0.45 gm./mile in a normal driving cycle and comprising conduit means for carrying engine exhaust gases away from the engine for disposal into the atmosphere, a solid particulate filter positioned within the conduit means across the exhaust gas path comprising:
   a multiplicity of thin, interconnected walls defining at least one open inlet end face in communication with the exhaust gas upstream from the filter and at least one open outlet end face in communication with exhaust gas downstream from the filter and a multiplicity of cells each extending through the matrix from at least one of said open end faces;
   the thin walls having internal interconnected open porosity of a volume and mean pore diameter sufficient to enable the fluid to flow through the thin walls and to restrain at least a significant portion of the particulates from passing completely through the thin walls in any direction;
   an inlet group of the cells each open only at at least one of the inlet end faces;
   an outlet group of the cells each open only at at least one of the outlet end faces and closed proximal to each inlet end face; and
   the volume of the internal open porosity of the thin walls and the mean diameter of the pores forming the open porosity further lying within the area defined by the boundary lines connecting the points A-B-C-D in FIG. 5.

2. The system of claim 1 wherein:
said thin walls are not greater than about 0.76 mm. thick.

3. The system of claim 1 wherein:
all of said cells have a transverse cross-sectional density of at least about 3.9 cells/cm.$^2$.

4. The system of claim 3 wherein:
said thin walls are of a substantially uniform thickness between about 0.30 mm. and 0.76 mm.

5. The system of claim 4 wherein:
the transverse cross-sectional density of said cells is between about 15.5 and 31 cells/cm.$^2$.

6. The system of claim 5 wherein:
the thin walls are formed from a ceramic based material.

7. The system of claim 6 wherein:
the thin walls are formed from a batch mixture consisting essentially of:
a 100% by weight portion kaolin clay, talc and alumina, and
at least an additional 25% by weight portion of graphite; and wherein:
the talc has an average particle size greater than about 30 microns.

8. The system of claim 1 or 5 wherein:
said multiplicity of cells extend in a substantially longitudinal and mutually parallel fashion between one inlet end face and one outlet end face on opposing outer surfaces of the filter.

9. The system of claim 8 wherein:
the transverse cross-sectional geometry of said multiplicity of cells are substantially uniformly sized squares.

10. The system of claim 9 wherein:
each inlet cell shares thin walls in common only with cells of the outlet groups; and
each cell of the outlet group shares thin walls in common only with cells of the inlet group.

11. The system of claim 9 wherein:
between one-half and three-quarters of the multiplicity of cells belong to the inlet group and substantially all of the remaining cells of the multiplicity belong to the outlet group.

12. In an exhaust system of a light duty vehicle for disposing into the atmosphere exhaust gases generated by a diesel engine producing particulates at an average about 0.45 gm/mile or less in a normal driving cycle, a diesel particulate filter positioned within the exhaust system and comprising:
   a multiplicity of interconnected thin porous walls defining on one outer surface of the filter an inlet end face communicating with exhaust gases in the exhaust system between the filter and the engine and on an opposing outer surface of the filter an outlet end face communicating with exhaust gases in the exhaust system between the filter and the atmosphere and a multiplicity of cells extending in a substantially longitudinal and mutually parallel fashion through the filter from at least one of the open end faces;
   an inlet group of cells each open at the inlet end face and said filter including means closing the inlet cells where they adjoin the outlet end face;
   an outlet group of cells each open at the outlet end face and said filter including means closing the outlet cells where they adjoin the inlet end face;

the thin walls being formed from a cordierite material and having an internal interconnected open porosity of a volume and mean pore diameter sufficient to enable the fluid to flow through the thin walls and to restrain at least a portion of the particulates from passing completely through the thin walls; and the volume of the internal open porosity of the thin walls and the mean diameter of the pores forming the porosity further lying within the area defined by the boundary lines connecting the points A-B-C-D in FIG. 5.

13. The system of claim 12 wherein:

said thin walls are not greater than about 0.76 mm. thick.

14. The system of claim 13 wherein: said multiplicity of cells have a transverse cross-sectional density of at least 3.9 cells/cm.$^2$.

15. The system of claim 14 wherein:

said multiplicity of cells extend substantially in a longitudinally and mutually parallel fashion between the inlet end face and the outlet end face; and the transverse cross-sectional density of said cells is not greater than about 62 cells/cm.$^2$.

16. The system of claim 5 or 15 wherein:

the open porosity is substantially uniformly distributed and randomly interconnected through the thin walls.

17. The system of claim 15 wherein:

said transverse cross-sectional density is between about 15.5 and 31 cells/cm$^2$.

* * * * *